United States Patent
Weiss et al.

(10) Patent No.: US 8,364,565 B2
(45) Date of Patent: Jan. 29, 2013

(54) SYSTEMS AND METHODS FOR DATA PROCESSING

(75) Inventors: Burkhard Weiss, Wiesloch (DE); Dirk Becker, Malsch (DE)

(73) Assignee: SAP AG, Walldorf (DE)

(*) Notice: Subject to any disclaimer, the term of this patent is extended or adjusted under 35 U.S.C. 154(b) by 1800 days.

(21) Appl. No.: 11/290,430

(22) Filed: Dec. 1, 2005

(65) Prior Publication Data

US 2006/0155568 A1 Jul. 13, 2006

Related U.S. Application Data (60) Provisional application No. 60/631,891, filed on Dec. 1, 2004.

(30) Foreign Application Priority Data

Mar. 18, 2005 (EP) .................................... 05005941

(51) Int. Cl.
*G06Q 40/00* (2012.01)
(52) U.S. Cl. .......................................... 705/35; 705/40
(58) Field of Classification Search ............... 705/35, 705/40
See application file for complete search history.

(56) References Cited

U.S. PATENT DOCUMENTS

| | | | |
|---|---|---|---|
| 6,026,238 A | 2/2000 | Bond et al. | |
| 6,757,689 B2 | 6/2004 | Battas et al. | |
| 7,171,401 B2* | 1/2007 | Tanaka | 707/3 |
| 7,236,950 B2* | 6/2007 | Savage et al. | 705/34 |
| 2003/0033218 A1* | 2/2003 | Flaxer et al. | 705/27 |
| 2003/0216964 A1 | 11/2003 | MacLean et al. | |
| 2004/0158480 A1* | 8/2004 | Lubars et al. | 705/1 |
| 2004/0254824 A1 | 12/2004 | Loucaides et al. | |
| 2005/0044017 A1 | 2/2005 | Foss et al. | |
| 2005/0071177 A1 | 3/2005 | Berger | |
| 2005/0246269 A1 | 11/2005 | Smith | |
| 2006/0178958 A1 | 8/2006 | Abdelfattah et al. | |
| 2006/0282637 A1 | 12/2006 | Yamauchi et al. | |
| 2007/0038561 A1 | 2/2007 | Vancini et al. | |

FOREIGN PATENT DOCUMENTS

EP 1482418 A1 12/2004

OTHER PUBLICATIONS

Communication and Search Report from the European Patent Office, dated Nov. 11, 2005 (5 pages), for Application No. 05/08548.8.
Communication and Search Report from the European Patent Office, dated Jul. 27, 2005, 7 pages.

* cited by examiner

*Primary Examiner* — Thomas Dixon
*Assistant Examiner* — Benjamin S Fields
(74) *Attorney, Agent, or Firm* — Finnegan, Henderson, Farabow, Garrett & Dunner, LLP (57) ABSTRACT

Methods and systems are disclosed for managing bundle pricing of services. In one implementation, a system comprises a database for storing master contracts and billing customizing tables. The master contracts refer to the data of the billing customizing tables by means of result and condition attributes. This has the advantage that a modification of the billing customizing data, such as for the purpose of changing the bundle pricing scheme for the master contracts, does not require storage of the updated data in the database.

19 Claims, 4 Drawing Sheets

SYSTEMS AND METHODS FOR DATA PROCESSING

CROSS REFERENCE TO RELATED APPLICATION(S)

The present application claims priority under 35 U.S.C. §119 to U.S. Provisional Patent Application No. 60/631,891, filed on Dec. 1, 2004, and European Patent Application No. EP 05005941.9, filed Mar. 18, 2005. The entire contents of each are expressly incorporated herein by reference to their entireties.

TECHNICAL FIELD

The present invention generally relates to the field of data processing systems and related methods. More particularly, and without limitation, the invention relates to computer-implemented systems and methods for managing bundle pricing of services.

BACKGROUND INFORMATION

Bundle pricing of services is known in various industries, such as in the banking and telecommunication industries. For example, a telecommunication customer is charged with telecommunication fees for various telecommunication services, such as voice communication, data communication, the use of pre-paid and post-paid services, and/or the transmitted data volume. Typically the customer receives a rebate for the telecommunication services depending on the amount of usage of the various telecommunication services.

Bundle pricing is also commonly used in retail banking. For instance, a bank's customer gets a rebate for bank fees, such as fees for account maintenance fees, inter-account transfers, debit orders, electronic account payments, cash withdrawals and/or interest rates, when a certain condition is fulfilled, such as when one of the accounts of the customer exceeds a defined threshold balance.

Bundle pricing conditions, such as the threshold balance, may be stored with a customer contract data record. If the threshold balance needs to be changed, this requires storage of a new threshold value for each customer master contract. This is a common disadvantage of known data processing systems that are used for bundle pricing, as storing the new threshold value for thousands or even millions of customer master contracts requires a relatively long processing time and has a relatively high processing expense.

Therefore, there is a need to provide improved data processing systems and methods that facilitate a reduction of the data processing resources for bundle pricing applications.

SUMMARY OF THE INVENTION

In accordance with embodiments of the present invention, a data processing system is provided that comprises first storage means for storing sets of account identifiers, wherein at least some of the account identifiers have assigned thereto a condition attribute of a predefined set of condition attributes and a result attribute of a predefined set of result attributes. The data processing system may also comprise second storage means for storing a condition rule and a condition value for each condition attribute of the predefined set of condition attributes and for storing a result rule and result value for each result attribute of the predefined set of result attributes.

The first storage means may be implemented by a large database or a plurality of databases that hold the master data of a bank's customers. The second storage means only requires a minimal amount of storage as the condition rules, condition values, result rules, and result values only need to be stored once, and not for every customer.

In accordance with an embodiment of the invention, the data processing system may also comprise first program means for determining a sub-set of the account identifiers of a set of account identifiers, wherein the account identifiers of the sub-set have a common condition attribute, and a second program means for determining if the sub-set fulfils the condition rule of the common condition attribute when applied with the respective condition value. Third program means may also be provided to calculate, if the sub-set fulfils the condition rule applied with the respective condition value, a result for each account identifier of the sub-set using the respective result rule and result value.

Embodiments of the present invention are beneficial as the condition rules, condition values, result rules, and result values are stored separately from the sets of account identifiers, e.g., the master contract data of the customers. This facilitates the updating of the condition rules, condition values, result rules, and result values without a need to change the customer master data.

In accordance with an embodiment of the present invention, the data processing system comprises a database for storing master contracts and billing customizing tables. The master contracts refer to the billing customizing data by means of result and condition attributes. This has the advantage that a modification of the billing customizing data, such as for the purpose of changing the bundle pricing scheme for the master contracts, does not require storage of the updated data in the database.

In accordance with another embodiment of the present invention, a scheduler is used for determining a priority of the sets of account identifiers for which processing is due or overdue. The scheduled sets of account identifiers are processed as a batch job without a need for user interaction. For example, the periodicity of the processing i.e., the bundle pricing, may be defined for each customer master contract.

In accordance with a further embodiment of the present invention, a bundle pricing data processing system is coupled to an account management system that keeps the accounts identified by the account identifiers. The account management system may have a billing component for charging default service fees. In this instance, the results calculated by the data processing system may be credited to the respective accounts. Alternatively, the complete billing is performed by the data processing system taking into account default bank fees and rebates that are given to a customer if certain condition rules applied with the respective condition values are fulfilled. This facilitates the use of a legacy account management system for advanced pricing applications. In particular, this avoids a need to replace a legacy account management system if advanced pricing applications are to be introduced.

In accordance with an embodiment of the present invention, a bundle pricing application and the account management system are coupled by an interface that implements a request-response protocol. The bundle pricing application may request account/transaction data from the account management system that it requires to apply the condition and/or result rules to a given master contract or set of scheduled master contracts. The account management system may then respond with the requested data via the interface.

In accordance with another embodiment of the present invention, a graphical user interface is provided for selecting condition attributes and result attributes for a customer master contract. This facilitates the registration of a new customer.

After a certain set of accounts has been opened, the bank clerk can select one or more condition attributes for each of the accounts and/or one or more result attributes depending on the agreement with the customer. This provides a high degree of flexibility for the bundle pricing of the set of accounts.

Embodiments of the present invention also relate to methods of managing bundle pricing. The method may comprise storing sets of account identifiers, at least some of the account identifiers having assigned thereto a condition attribute of a predefined set of condition attributes and a result attribute of a predefined set of result attributes. The method may also comprise storing a condition rule and a condition value for each condition attribute of the predefined set of condition attributes, and storing a result rule and a result value for each result attribute of the predefined set of result attributes. The method may further comprise determining the sub-set of one of the sets of account identifiers having a common condition attribute of the predefined set of condition attributes, and determining if the sub-set fulfils the condition rule of the common condition attribute, when applied with the respective condition value. The method may also comprise calculating a result for each account identifier of the sub-set, if the sub-set fulfils the condition rule, by applying the respective result rule with the result value, wherein each set of account identifiers defines a bundle of services, and wherein the calculated results serve for pricing of the bundle.

In accordance with an embodiment of the present invention, the bundle of services may comprise financial and/or bank services.

In accordance with an embodiment of the present invention, the bundle of services may comprise telecommunication services.

In accordance with an embodiment of the present invention, at least one of the account identifiers belongs to a loyalty points account.

In accordance with an embodiment of the present invention, at least one of the account identifiers belongs to a prepaid account.

Embodiments of the present invention also relate to a computer program product comprising computer executable instructions for performing methods of bundle pricing.

BRIEF DESCRIPTION OF THE DRAWINGS

In the following exemplary embodiments of the invention are described in greater detail by way of example only making reference to the drawings in which.

DESCRIPTION OF THE EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

Figure 1:
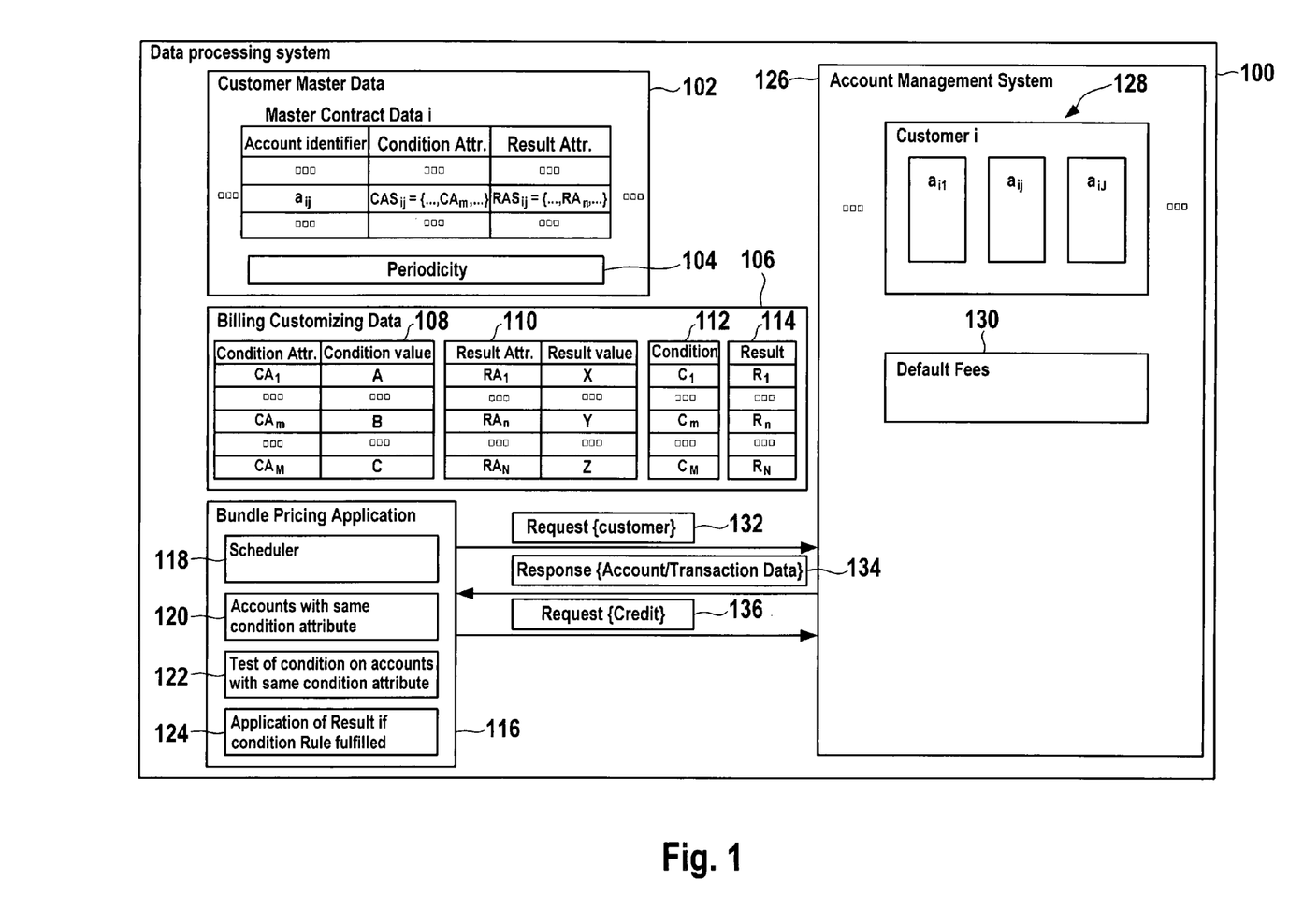
FIG. 1 illustrates a block diagram of an exemplary data processing system, consistent with an embodiment of the present invention.

FIG. 1 shows an exemplary data processing system 100 that has a database 102 for storing master data, such as master contract data. The database 102 can be implemented as a single database or as a distributed database. In the embodiment of FIG. 1, the database 102 serves for storage of master contract data i for each customer i. The number of master contracts and customers i can be as large as several thousands or even millions, such as in the case for large retail banks or telecommunication operators or service providers.

The master contract data i that describes the master contract i of a customer i contains a set of account identifiers, i.e., account numbers, ai1, ai2, . . . aij, . . . , aiJ. The number of accounts J of the master contracts i is typically 1, 2, or more. For example, the customer i has a deposit account ai1, a current account ai2, a stock depot ai3 and an account ai4 for collecting customer loyalty points or 'miles' under a miles-and-more like customer loyalty scheme.

At least some of the account identifiers of the master contract data i have assigned a respective set of condition attributes. For example, the account identifier aij has assigned the set of condition attributes CASij which contains a sub-set of the condition attributes CA1, CA2, . . . , CAm . . . , CAM, where M is the total number of the predefined condition attributes. Likewise, a set of result attributes can be assigned to one or more of the account identifiers of the master contract data i. For example, a set of result attributes RASij is assigned to the account identifier aij. The set of result attributes RASij contains a sub-set of the complete set of predefined result attributes RA1, RA2, . . . , RAn, . . . , RAN, where N is the total number of predefined result attributes.

In addition, a timer data value 104 may be stored with the master contract data i for the purpose of scheduling the master contract data i for processing at certain periodic time intervals, such as daily, weekly, monthly, or yearly.

The data processing system 100 may also comprise storage 106 for storing billing customizing data. The billing customizing data includes a table 108 for storing the predefined set of condition attributes. Each condition attribute has an assigned condition value. For example, the condition attribute CA1 has the assigned condition value A; the condition attribute CAm has the assigned condition value B; and the condition attribute CAM has the assigned condition value C.

The billing customizing data also includes a table 110 for storing the set of predefined result attributes and their respective result values. For example, the result attribute RA1 has the result value X, the result attribute RAn has the result value Y, and the result attribute RAN has the result value Z. The billing customizing data 106 further includes a table 112 for storage a set of condition rules C1, . . . , Cm, . . . CM for the respect conditions. Likewise, a table 114 of the billing customizing data serves for storage of result rules R1, . . . , Rn, . . . RN.

An arbitrary condition m may be constituted by the condition rule Cm stored in the table 112 together with the condition value B of the respective condition attribute CAm stored in the table 108. Likewise, a result is obtained by applying one of the result rules Rn stored in the table 114 together with the result value Y of the respective result attribute RAn stored in table 110. It is important to note that the data volume of the billing customizing data stored in the storage 106 is very limited in comparison to the size of the database 102.

The data processing system 100 may also include a bundle pricing application program 116 for bundle pricing of the account bundles defined by the master contract data stored in the database 102. The bundle pricing application program 116 includes a scheduler 118 for scheduling the processing of one or more master contract data i. For example, the scheduler 118 determines the master contract data i of database 102 that is due or overdue for processing using the timer data value 104 as a selection criterion. This results in a batch of master contract data i that can be processed as a batch job.

The bundle pricing application program 116 also includes a program module 120 for determining a sub-set of the account identifiers contained in master contract data i that have a common condition attribute. Such a sub-set is further examined by means of the program module 122 which applies the respective condition of the common condition attribute as defined in the billing customizing data stored in storage 106 to the sub-set. If the sub-set fulfils the respective condition, the program module 124 is invoked which determines the respective result for each of the account identifiers of the sub-set.

The data processing system 100 also includes an account management system 126 for keeping the accounts of the customers. This is accomplished by means of a database 128 that stores the account data and/or transaction data for all accounts of all customers. Again, the database 128 can be a central database or a distributed database.

In the embodiment of FIG. 1, the account management system 126 has a program module 130 that serves for billing default fees for a certain number of services, such as account maintenance, inter-account transfers, debit orders, electronic account payments, cash withdrawals, interest rates, etc. These default fees do not take into account special bundle pricing rebates as such rebates are determined by the bundle pricing application program 116 in the present embodiment considered here.

In operation, various services are provided for the customer i by means of his or her accounts ai1, aij, aiJ. The program module 130 determines the default fees incurred for providing the various services, such as account maintenance fees, transaction fees, cash withdrawals from automatic teller machines, purchase or sale of stock, etc.

For the purpose of bundle pricing of the services provided to the customers, the bundle pricing application program 116 starts its scheduler 118 in order to identify master contract data i in the database 102 that are due or overdue for bundle pricing processing. For example, the scheduler 118 is started on each business day in order to find those master contract data i in the database 102 that have a timer data value 104 that matches the current date. As a consequence, the scheduler 118 identifies a batch of master contract data i that is due or overdue for bundle pricing processing.

Subsequently, the program module 120 is started for the batch processing. The program module 120 checks each master contract data i for the presence of account identifiers within the given master contract data i that have a common condition attribute. For those account identifiers that have a common condition attribute, the program module 122 is used in order to apply the respective condition of the common condition attribute as defined in the billing customizing data stored in storage 106. If the sub-set of account identifiers of the master contract i fulfils the condition of the common condition attribute, the program module 124 is used to determine the respective results for the account identifiers of the sub-set. This is accomplished by using the result rules and result values stored in the billing customizing data.

For testing the condition of the common condition attribute, the program module 122 generates a request 132 that identifies the master contract data i and thus the customers i of the batch job to be processed. The account management system 126 generates a response 134 which contains respective account and/or transaction data of the customers identified in the request 132. This account and/or transaction data forms the basis for testing the condition by the program module 122.

The results that are determined by the program module 124 for one of the master contract data i are summed up to provide a credit value. The program module 124 generates a request 136 in order to request that the credit value be credited to the respective customer i through one of the customer's accounts by the account management system 126.

In order to reduce the amount of account/transaction data that needs to be transmitted from the account management system 126 to the bundle pricing application 116 upon the request 132, the request 132 can specify the kind of account/transaction data that is required with a finer level of granularity. This may be accomplished by assigning request categories to the condition rules or condition attributes and/or the result rules or result attributes stored in storage 106. Each request category specifies a certain kind of account/transaction information that is required to apply the respective condition and/or result rule. The request 132 can indicate the request categories in order to limit the data volume returned by the response 134. An interface that implements a request-response protocol, such as http, may be used to couple the bundle pricing application and the account management system.

Figure 2:
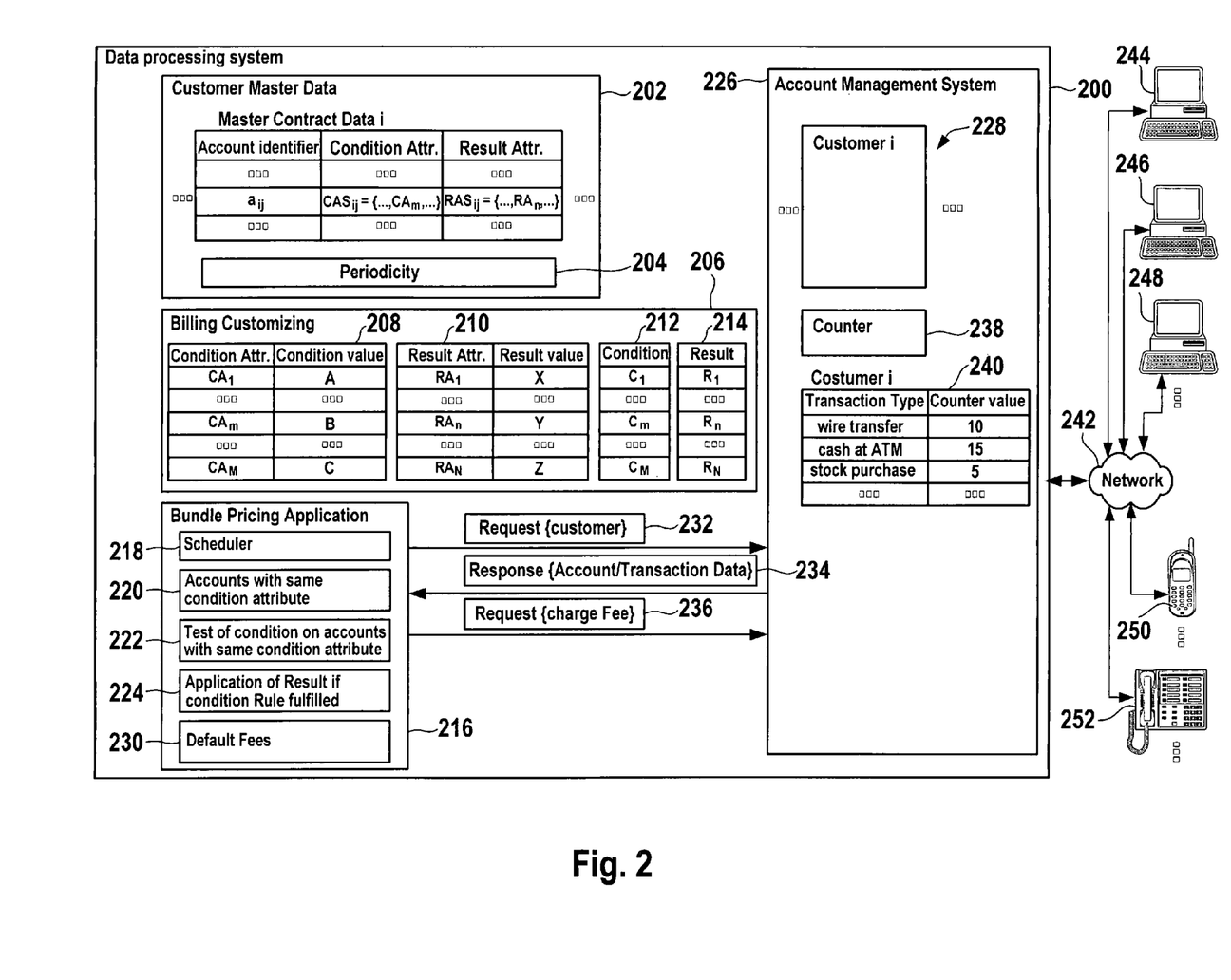
FIG. 2 illustrates a block diagram of another exemplary data processing system, consistent with an embodiment of the present invention.

FIG. 2 shows another exemplary data processing system 200, in accordance with an embodiment of the invention. Elements of FIG. 2 that correspond to elements in the embodiment of FIG. 1 are designated using like or similar reference numerals. In the embodiment of FIG. 2, the account management system 226 does not charge the default fees. The account management system 226 has a counter program module 238 that serves to generate a history log 240 for each customer i. For example, the history log 240 of customer i contains a table with various transaction types and respective counter values. For example, the customer i has performed a number of 10 wire transfers, 15 cash withdrawals from an automatic teller machine (ATM), and 5 stock purchases during the current month.

In response to the request 232, the response 234 provides the history logs of the customers identified by the request 232 to the bundle pricing application. The bundle pricing application calculates the respective default fees for each customer i and subtracts any rebates that are determined by the program module 224. The resultant charges for the customers are sent to the account management system 226 by means of request 236.

The data processing system 200 may be coupled to various client devices via a network 242, such as personal computers 244, 246, 248, and/or mobile telephones 250, and/or telephones 252. For example, the personal computer 244 is used by an administrator for administration of the billing customizing data stored in storage 206. The administrator has the user rights that are required in order to view and modify the billing customizing data 206. It is important to note that a modification of the billing customizing data does not require any change of the content of the database 202.

The personal computers 246, 248, may belong to customers that may use these computers for the purpose of online banking or they may belong to bank clerks. Likewise, the mobile phones 250 and telephones 252 may be used for telephone banking.

Alternatively, the data processing system 200 belongs to a telecommunication services provider, such as the operator of a telecommunications network. In this instance, the customer i can have a number of accounts for telecommunication fees, such as a post-paid account, a pre-paid account, and an account for charging data downloads.

As in the embodiment of FIG. 1, the request 232 may specify the required information for applying the condition and/or result rules with a finer level of granularity. For example, the request 232 may specify the transaction types for which the counter values are required from the table 240 for processing of the condition and/or result rules with respect to a scheduled master contract. This may be accomplished by request categories assigned to condition and/or result rules or attributes in the storage 206 where each request category specifies certain transaction types for which the counter values are required.

Figure 3:
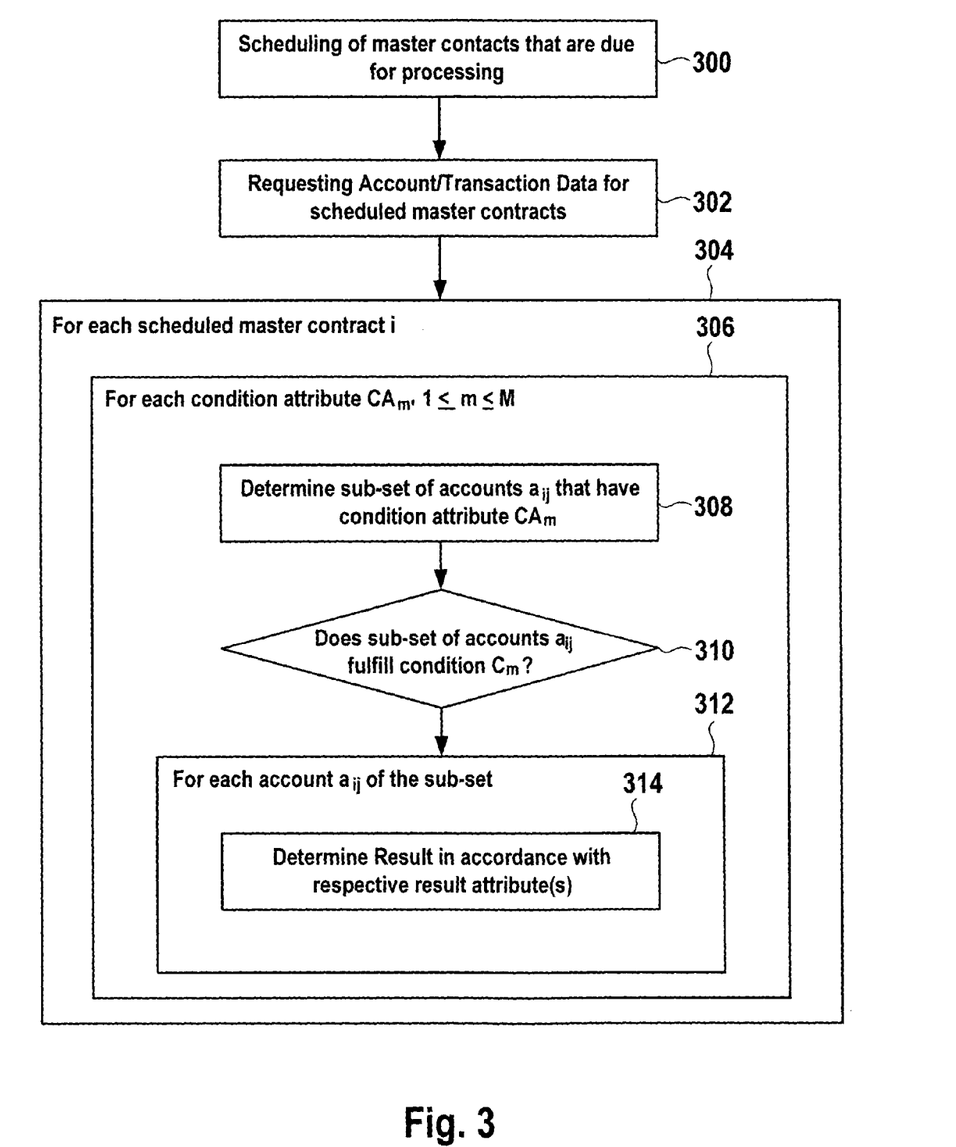
FIG. 3 illustrates a flowchart of an exemplary data processing method, consistent with an embodiment of the present invention.

FIG. 3 shows a flowchart of an exemplary method, which may be implemented with, for example, the data processing systems of FIGS. 1 and 2. In step 300, the scheduler schedules a batch of master contracts that are due or overdue for processing. In step 302, account/transaction data, such as a history log, is requested from the account management system for the batch of scheduled master contracts.

In the following step 304, the batch of scheduled master contracts is processed. For each scheduled master contract i the step 306 is carried out. For each condition attribute CAm the steps 308 through 314 are performed as sub-steps of step 306 for a given scheduled master contract i starting with m=1.

In step 308, the sub-set of accounts contained in the currently processed master contract i that have the common condition attribute CAm is determined, if there is such a sub-set. If such a sub-set of accounts may be determined in step 308, the step 310 is performed where the condition of the common condition attribute CAm is tested on the sub-set. If the condition is not fulfilled, a default fee may be charged as a result, depending on the implementation. If the contrary is true, the step 312 is carried out.

In step 312, the sub-step 314 is carried out for each account of the sub-set determined in step 308. In step 314, the result is determined for the currently processed account of the currently processed scheduled master contract in accordance with the applicable result rules and result values as identified by the one or more result attributes assigned to the currently processed account by the master contract data i. The result or the results, if there is more than one result for the currently processed account, may be charged to the account as an alternative to the default fee. Alternatively, the default fee is charged in any case, but the result is a credit or debit which is credited or debited to the customer.

In one embodiment, the kind of account/transaction data that is required for steps 310 and 314 is specified in the request of step 302. This may be done by defining categories of the account/transaction data and to indicate those categories which are required for the bundle pricing of a given master contract.

Figure 4:
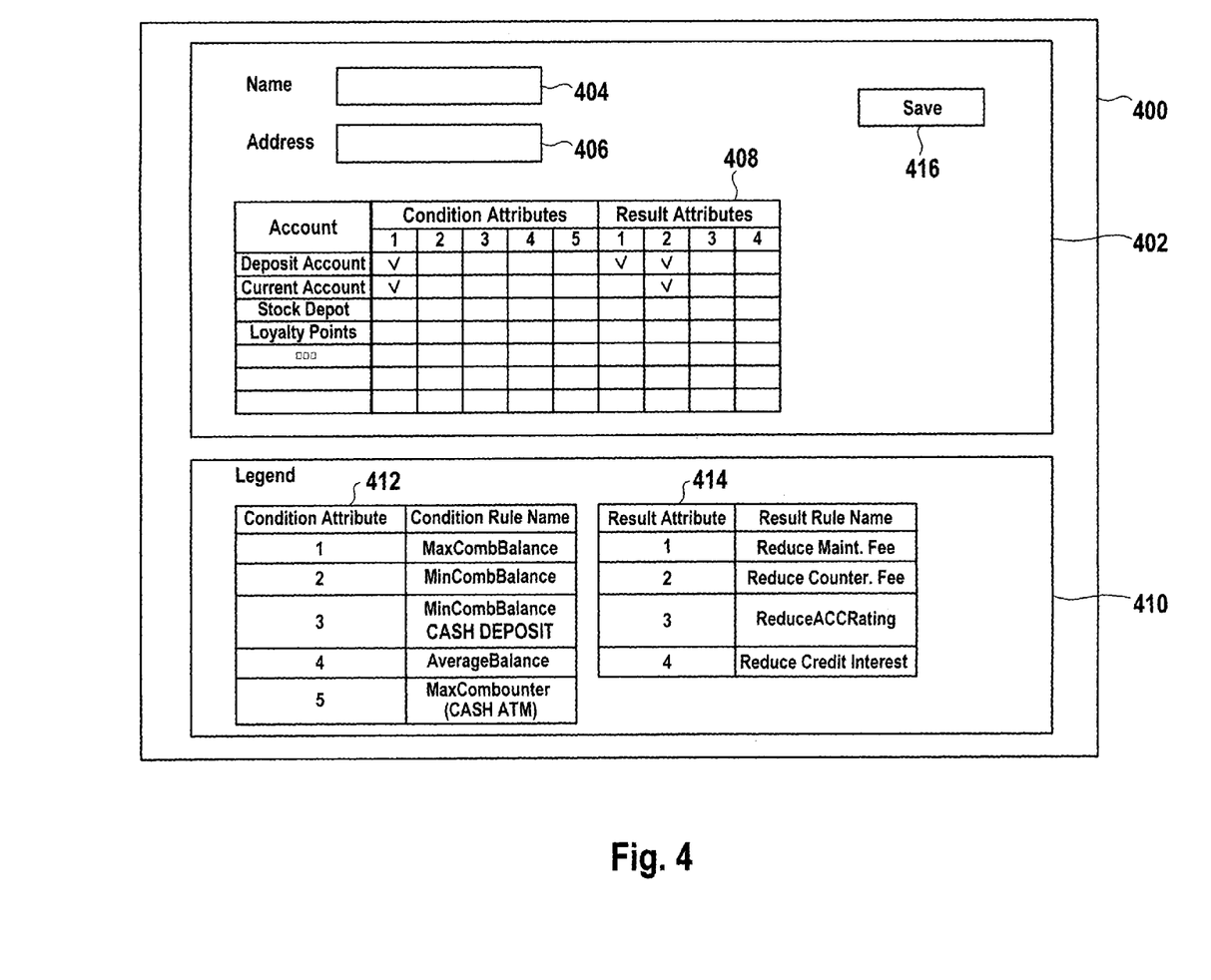
FIG. 4 illustrates an exemplary view of a data entry window for entering master contract data and selecting of condition and result attributes, consistent with an embodiment of the present invention.

FIG. 4 illustrates an exemplary window 400 that may be displayed on the monitor of a bank clerk for entry of a new master contract. The window 400 comprises a data entry portion 402 that includes data entry fields 404 and 406 for entry of personal data of the new customer, such as name and address, and a data entry matrix 408 for the setting of condition and result attributes. Also, the window 400 comprises a legend portion 410 that includes a legend 412 for the condition attributes and a legend 414 for the result attributes. The window 400 further comprises a save button 416 for uploading of the new master contract data to the data processing system e.g., the database 102 or 202 (cf. FIGS. 1 and 2).

In the embodiment of FIG. 4, there is a predefined set of condition attributes 1, 2, 3, 4, and 5 that are assigned to respective condition rules. For example, in accordance with the condition rule 'MaxCombBalance' that is assigned to the condition attribute 1, the maximum combined balances of the accounts of the customer that have the condition attribute 1 is determined. If the maximum combined balances of the accounts exceeds the respective condition value stored in the billing customizing data for that condition rule, the condition is fulfilled.

The condition rule of condition attribute 2 'MinCombBalance' relates to a minimum combined balance of the accounts of the customer that have the condition attribute 2. The condition rule 'MinCombBalance' is fulfilled if the minimum combined balance does not exceed the respective condition value.

Likewise, the condition rule 'MinCombBalance CASH DEPOSIT' relates to the minimum combined balances, but only as far as cash deposit is concerned. The condition rule 'AverageBalance' relates to the average balance of the accounts that have condition attribute 4. The condition 'AverageBalance' is fulfilled if the average balance of the accounts that have condition attribute 4 exceeds the respective threshold value. The condition rule 'MaxCombounter' relates to the cash withdrawn from automatic teller machines. If this exceeds the threshold value given by the respective condition value as far as the accounts that have the condition attribute 5 are concerned, the condition is fulfilled.

In the embodiment of FIG. 4, the predefined set of result attributes contains the result attributes 1, 2, 3, and 4. The result attribute 1 is assigned to the result rule 'reduce maintenance fee'. If the account to which the result attribute 1 is assigned meets a condition, the account maintenance fee is reduced by the result value of the result rule given in the billing customizing data. Likewise, there are result rules for reducing the counter fee i.e., the fee per posting, reduction of the customer's rating and reduction of the credit interest the customer needs to pay if he or she overdraws his or her account.

In the example considered here, the new customer has opened a deposit account, a current account, a stock depot, and loyalty points account. By clicking on the data entry matrix 408 the bank clerk can enter check marks for selection of condition attributes and result attributes, as shown in FIG. 4.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects may also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules may be created using any of the techniques known to one skilled in the art or can be designed in connection with existing software. For example, program sections or program modules can be designed in or by means of Java, C++, HTML, XML, or HTML with included Java applets or in SAP R/3 or ABAP. One or more of such software sections or modules may be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A data processing system comprising:
   storage means for storing account identifiers, the account identifiers each being assigned a corresponding condition reference and a corresponding result reference;
   a memory device configured to store:
      a condition rule and condition value for each condition reference, the condition rules and condition values describing conditions for maintaining or changing a status of a corresponding account, and
      a result rule and a result value for each result reference, the result rules and result values describing a result of maintaining or changing the status of the corresponding account;
   first program means for:
      grouping the account identifiers that share a common condition reference;
      identifying a common condition value and a common condition rule for the common condition reference of the grouped account identifiers;
   second program means for applying the common condition value to the grouped account identifiers to determine if the grouped account identifiers fulfil the common condition rule; and
   third program means for calculating a result for each of the grouped account identifiers by applying the result rule and the result value of each of the grouped account identifiers, upon a determination by the second program means that the grouped account identifiers fulfil the common condition rule.

2. The data processing system of claim 1, wherein the account identifiers are related to data of a master contract.

3. The data processing system of claim 1, wherein at least one of the account identifiers has assigned thereto a timer data value, and further comprising a scheduler for identification of account identifiers for which the respective timer values indicate that processing is due, and for processing the identified account identifiers as a batch job.

4. The data processing system of claim 1, further comprising an account management system for keeping the accounts identified by the account identifiers, wherein the account management system is coupled to the third program means.

5. The data processing system of claim 4, wherein the account management system comprises a billing component for charging default fees, and wherein the result calculated by the third program means is credited to the respective account.

6. The data processing system of claim 1, wherein the memory device is accessible for modification of the condition rules, condition values, result rules, and result values by an administrator.

7. The data processing system of claim 1, further comprising a graphical user interface for setting at least one of the condition references and at least one of the result references for each account identifier of one group of account identifiers.

8. The data processing system of claim 1, wherein at least one of the condition value and the result value is an absolute value or a percentage value.

9. The data processing system of claim 1, wherein the condition references comprise a first condition reference having a first condition value, the first condition value defining a threshold value, and wherein the second program means is adapted to aggregate balances of accounts identified by the grouped account identifiers that have the first condition reference and to compare the aggregated balance with the threshold value defined by the first condition value.

10. A data processing method, comprising:
    storing account identifiers in a first memory device, the account identifiers each being assigned a corresponding condition reference and a corresponding result reference;
    storing a condition rule and a condition value in a second memory device for each condition reference, the condition rules and condition values describing conditions for maintaining or changing a status of a corresponding account;
    storing a result rule and a result value in the second memory device for each result reference, the result rules and result values describing a result of maintaining or changing the status of the corresponding account;
    grouping the account identifiers that share a common condition reference;
    identifying, by a processor, a common condition value and a common condition rule for the common condition reference of the grouped account identifiers;
    applying the common condition value to the grouped account identifiers to determine if the grouped account identifiers fulfil the common condition rule; and
    calculating a result for each of the grouped account identifiers by applying the result rule and the result value of each of the grouped account identifiers, upon a determination that the grouped account identifiers fulfil the common condition rule.

11. The method of claim 10, further comprising:
    scheduling the account identifiers that are due for processing; and
    processing the account identifiers that are due for processing as a batch job.

12. The method of claim 10, further comprising receiving at least one of account and transaction data from an account management system for application of the condition rules with the condition values and the result rules with the result values.

13. The method of claim 10, further comprising storing at least one of a new condition value and a new result value in the second memory device while leaving the content of the first memory device unaffected.

14. The method of claim 10, further comprising:
    entering master data for a customer master contract, wherein the master data comprises a set of account identifiers; and setting at least one of the condition references and at least one of the result references for at least one of the account identifiers of the set.

15. A computer-readable medium including instructions for performing, when executed by a processor, a method for providing data processing, the method comprising:

storing account identifiers in a first memory device, the account identifiers each being assigned a corresponding condition reference and a corresponding result reference;

storing a condition rule and a condition value in a second memory device for each condition reference, the condition rules and condition values describing conditions for maintaining or changing a status of a corresponding account;

storing a result rule and a result value in the second memory device for each result reference, the result rules and result values describing a result of maintaining or changing the status of the corresponding account;

grouping the account identifiers that share a common condition reference;

identifying, by a processor, a common condition value and a common condition rule for the common condition reference of the grouped account identifiers;

applying the common condition value to the grouped account identifiers to determine if the grouped account identifiers fulfil the common condition rule; and calculating a result for each of the grouped account identifiers by applying the result rule and the result value of each of the grouped account identifiers of the sub set, upon a determination that the grouped account identifiers fulfil the common condition rule.

16. The computer-readable medium of claim 15, wherein the method further comprises:

scheduling account identifiers that are due for processing; and processing the account identifiers that are due for processing as a batch job.

17. The computer-readable medium of claim 15, wherein the method further comprises:

receiving at least one of account and transaction data from an account management system for application of the condition rules with the condition values and the result rules with the result values.

18. The computer-readable medium of claim 15, wherein the method further comprises:

storing at least one of a new condition value and a new result value in the second memory device while leaving the content of the first memory device unaffected.

19. The computer-readable medium of claim 15, wherein the method further comprises:

entering master data for a customer master contract, wherein the master data comprises a set of account identifiers; and setting at least one of the condition references and at least one of the result references for at least one of the account identifiers of the set.

* * * * *